Jan. 20, 1959 C. P. MILLER ET AL 2,869,418
PLATE HOLDING MICROPHOTOMETER ATTACHMENT
Filed March 8, 1956
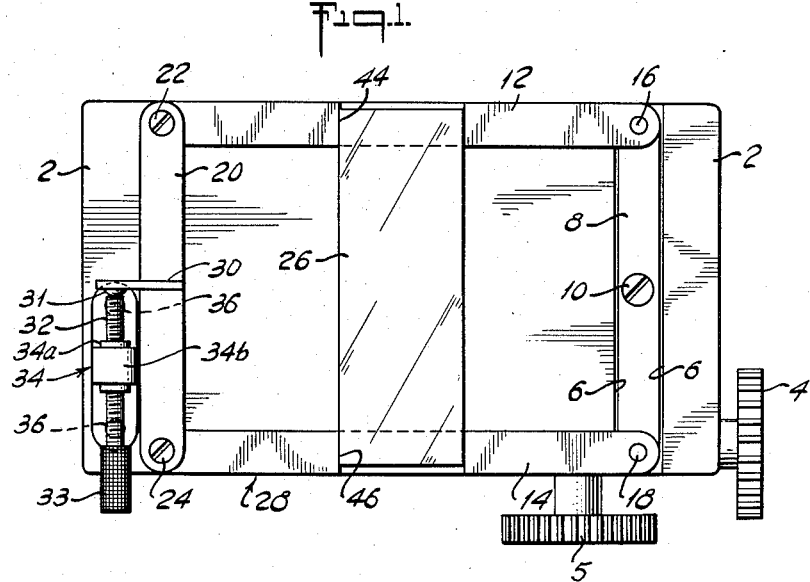
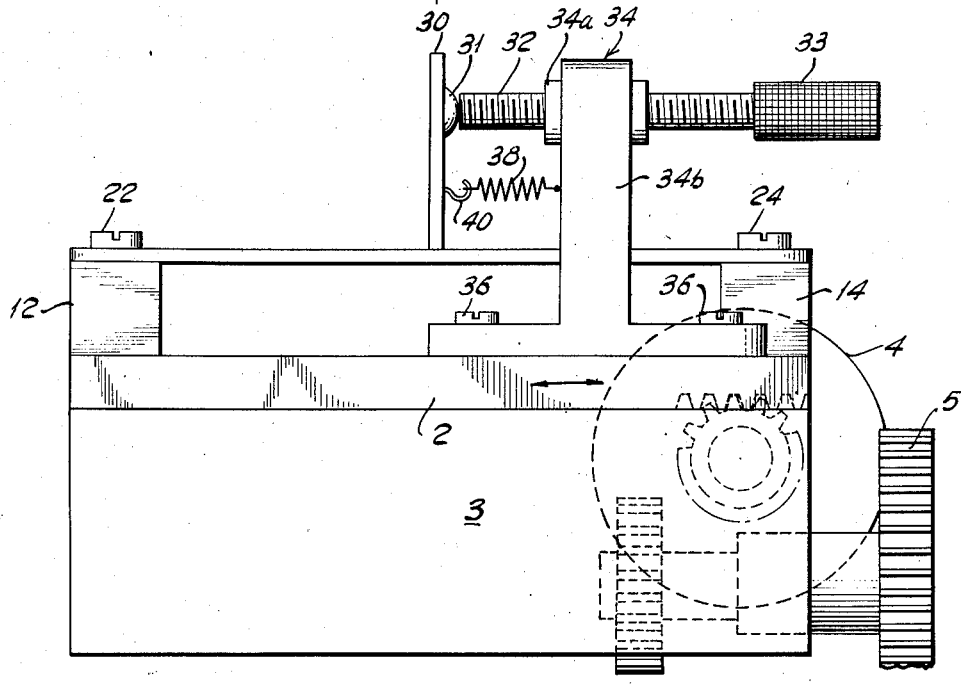

United States Patent Office 2,869,418
Patented Jan. 20, 1959

2,869,418

PLATE HOLDING MICROPHOTOMETER ATTACHMENT

Carl P. Miller, Poughkeepsie, and Allan Jamieson, Beacon, N. Y., assignors to The Texas Company, New York, N. Y., a corporation of Delaware Application March 8, 1956, Serial No. 570,308

4 Claims. (Cl. 88—14)

This invention relates to an improved microphotometer. More particularly, this invention relates to a microphotometer having means to precisely and quickly align spectrum lines on a photographic plate in exact parallel relationship with a linear light beam.

A microphotometer, briefly described, is a device for measuring the densities of spectrum lines which have been recorded on a photographic plate. Generally, such devices have a means for moving a frame, to which the photographic plate is clamped, from side to side or laterally and means for moving the plate from front to back. These movements are, respectively, to bring the individual lines in the spectrum into an exact overlying relationship to a ray of light projected from behind a slit in the base of the microphotometer and to bring a line in a succeeding row of spectrum lines to a position to be measured.

The linear light from the slit must not only exactly overlie but must be exactly parallel to a spectrum line on the plate in order to obtain an accurate reading of the intensity or density thereof. To accomplish this, microphotometers are usually provided with means to rotate the portion of the device containing the slit whereby it can be moved to bring the linear ray of light into exact parallel relationship with the lines on the spectrum. It should be realized if the photographic plate is not originally clamped to the frame so that the spectrum lines are in exact parallel relationship to the forward and backward direction of movement of the frame, after the linear light from the slit is brought into parallel alignment with one line of a spectrum, any backward or forward movement of the frame will move the position of the line to the right or left relative to the linear light, thus bringing them out of an overlying relationship. It is almost impossible to initially clamp the plate to the frame so that the spectrum lines are in exact parallel relationship with the front to rear direction of movement since this exact relationship must be determined by the human eye.

Conventionally, to overcome this difficulty, to avoid having to make adjustments while reading the plate, to make background plate readings exactly in the same place in relation to the particular line, and to avoid losing the line as the plate is advanced from spectrum to spectrum in a front to back or back to front movement, formerly the operator did not initially clamp the plate to the frame but moved the frame front to back and rotated the photographic plate slightly with his fingers. This finger adjustment continued until the position of a line did not move to the left or right relative to the linear light when the frame was moved from front to back or vice versa.

The foregoing operation is extremely tedious, rather time consuming and demands a true and steady hand since the magnification of the instrument is about 20X. Any slight misalignment is magnified on the viewing screen twenty times, so that a movement of $\frac{1}{64}$ of an inch is seen as $\frac{5}{16}$ of an inch on the viewing screen. The operator in all cases had to move the plate with his fingers $\frac{1}{100}$ to $\frac{1}{32}$ of an inch. After completing this finger adjustment, the operator clamped the plate and commenced measuring line densities.

Therefore, it is an object of the present invention to provide a novel microphotometer attachment employing means to quickly position the spectrum lines on a photographic plate in exact parallel relationship with the front to back direction of movement of the photographic plate frame or holder. Further, it is an object of this invention to provide a microphotometer plate holding attachment which can be quickly and easily adjusted to the proper position.

To accomplish the above and other objects, there is provided in accordance with the present invention an improved photographic plate holding attachment for a microphotometer capable of projecting a linear light comprising a plate holding frame, a carriage, means to move said frame rotatably relative to said carriage, means to move said carriage from front to back relative to said linear light, and means to move said carriage laterally relative to said linear light. The means for rotating the frame relative to the carriage includes pivot means to attach the frame to the carriage. The pivotal or rotary movement of the frame is capable of adjustment by screw means which comprises an internally micro-threaded member which is securely mounted on the carriage and an externally micro-threaded member which is engaged in said internally threaded member and connected to said frame. The means used to connect the externally threaded member to the frame comprises a spring attached to and betwen the frame and the carriage whereby the frame or a part thereof will contact one end of the externally threaded member at all times and follow its linear movement as it is rotated within the threads of the internally threaded member. By following this slight linear movement the frame will be caused to pivot slightly for adjustment relative to the carriage and can thereby be made to assume an exact parallel relationship with forward or rearward direction of movement thereof.

The invention will be further understood by reference to the attached drawing in which Fig. 1 represents a top view of a microphotometer attachment which is used to position the photographic plate in order to properly measure the density of the spectra thereon. Fig. 2 is an enlarged drawing of an end view of Fig. 1.

In Fig. 1 a base or carriage 2 is shown which is capable of front to rear movement relative to a slit in the microphotometer (not shown) below which a ray of light is projected vertically. Knob 4 is provided to turn a gear engaged with a rack which provides the front to rear movement of the carriage. Another knob 5 is provided on the sub base 3 of the microphotometer to operate a gear and pinion mechanism for side to side movement of the carriage. A milled-out slot 6 is provided on carriage 2 in which a metal bar 8 is pivotally mounted at 10. Bars 12 and 14 are firmly secured at right angles to the metallic bar 8 at 16 and 18. Bar 20 is firmly secured at right angles to bars 12 and 14 at 22 and 24. It is seen, therefore, that bars 8, 20, 12 and 14 comprise a rectangular frame, broadly designated as 28, which is used as a holder for a photographic plate 26 which may be clamped thereto.

The milled-out portion or slot 6 in base 2 is sufficiently wide enough to allow slight pivotal movement of the bar 8 which is situated therein. This milled-out portion is not essential to the invention, but it is the preferred means employed in assembling the photographic plate positioning attachment of the microphotometer as such an arrangement facilitates operation of the device.

At the opposite side of the frame from pivot 10 on bar 20 is an upright slanting rigid piece of metal 30 extending outwardly from the frame. An externally micro-threaded pin or rod 32 is positioned in threaded engagement with the internally threaded member, broadly designated as 34. Internally threaded member 34 comprises an internally threaded sleeve 34a rigidly held by a stanchion 34b which is secured to the carriage 2 by bolt means 36 or the like. One end of the pin 32 abuts an upright piece 30 at convex portion 31 which is integral with the upright piece 30. Spring member 38 is attached at one end to the upright piece 30 by means of a hook 40 and attached at the other end to the stationary internally threaded member 34 whereby the frame 28 will pivotally follow the horizontal movement of pin 32 as it is rotated within the internally threaded member 34.

In operation of the improved device, the photographic plate is placed in slots or grooves 44 and 46 provided on the bars 12 and 14 and clamped therein. The instrument is turned on and the operator's eyes directed at the viewing screen (not shown). The right hand fingers move the base or carriage back to front or vice versa by means of the knob 4. The left hand fingers rotate the pin 32 by means of the knurled portion 33 which slightly pivots the frame 28 to which the photographic plate 26 is clamped. The pin 32 is turned until perfect alignment of the linear light with a spectrum line on the plate is obtained. This entire operation takes only about 10 seconds, is very precise, and has to be made only once after the plate is clamped. Now, any and all desired lines from spectrum to spectrum can be read on the instrument without any further adjustment.

Obviously, many modifications and variations of the invention as hereinbefore set forth, may be made without departing from the spirit and scope thereof and, therefore, only such limitations should be imposed as are indicated in the appended claims.

We claim:

1. A photographic plate holding attachment for a microphotometer capable of projecting a linear light beam comprising a carriage having a slot therein, a plate holding frame having one side mounted for pivotal movement within the slot in said carriage, adjustment means for the precise pivotal movement of said frame, means to move said carriage laterally relative to said linear light beam, and means to move said carriage longitudinally relative to said linear light beam.

2. A photographic plate holding attachment for a microphotometer capable of projecting a linear light beam comprising a carriage having a slot therein, a plate holding frame having one side mounted for pivotal movement within the slot in said carriage, screw means for adjustably pivoting said frame for movement relative to said carriage, means to move said carriage laterally relative to said linear light beam, and means to move said carriage longitudinally relative to said linear light beam.

3. A photographic plate holding attachment for a microphotometer capable of projecting a linear light beam as described in claim 2 wherein said screw means comprises an internally threaded member and an externally threaded member engaged therein, one of said threaded members being attached to said carriage and the other contacting said frame whereby rotation of one of said threaded members causes pivotal movement of said frame.

4. A photographic plate holding attachment for a microphotometer capable of projecting a linear light beam comprising a carriage having a slot therein, a rectangular plate holding frame having one side mounted within the slot in said carriage, pivot means to attach said side to said carriage, an internally micro-threaded member securely mounted on said carriage, an externally micro-threaded member engaged in said internally threaded member and contacting said frame, resilient means attached to and between said frame and said carriage whereby said frame will be pivotally adjusted relative to said carriage by following the longitudinal movement of said externally threaded member when it is rotated, means to move said carriage laterally relative to said linear light beam, and means to move said carriage longitudinally relative to said linear light beam.

References Cited in the file of this patent

UNITED STATES PATENTS

| 2,301,935 | Ehringhaus | Nov. 17, 1942 |
| 2,656,757 | Stern | Oct. 27, 1953 |

FOREIGN PATENTS

| 86,250 | Sweden | May 5, 1936 |